United States Patent [19]

Miller

[11] Patent Number: 5,112,556
[45] Date of Patent: May 12, 1992

[54] GOLF BALL APPARATUS AND METHOD FOR MANUFACTURE

[75] Inventor: Seward S. Miller, Avon Lake, Ohio

[73] Assignee: WPI Acqusition Corporation, Elyria, Ohio

[21] Appl. No.: 735,182

[22] Filed: Jul. 23, 1991

Related U.S. Application Data

[63] Continuation-in-part of Ser. No. 463,286, Jan. 10, 1990, abandoned.

[51] Int. Cl.⁵ ............................................. B29C 45/00
[52] U.S. Cl. ................................. 264/279; 249/119; 249/160; 264/259; 264/276; 264/328.8; 273/60 A; 273/60 B; 273/233; 425/450.1; 425/451.9; 425/589; 425/595
[58] Field of Search .......... 425/589, 595, 450.1, 425/451.9, DIG. 5, 183, 119; 264/555, 279, 259, 276, 328.6, 328.8; 249/119, 120, 160; 273/60 A, 60 B, DIG.5, 233

[56] References Cited

U.S. PATENT DOCUMENTS

| 259,984 | 6/1882 | Hyatt et al. | |
| 1,270,008 | 6/1918 | Cobb | |
| 2,178,774 | 6/1937 | Bogoslowsky | 154/17 |
| 2,298,057 | 10/1942 | Kelm | 425/451.9 |
| 2,361,348 | 10/1944 | Dickson et al. | 18/30 |
| 2,376,085 | 5/1945 | Radford et al. | 18/30 |
| 2,787,024 | 4/1957 | Smith | 18/59 |
| 3,147,324 | 9/1964 | Ward | 264/254 |
| 3,177,280 | 4/1965 | Ford et al. | 264/275 |
| 4,501,715 | 2/1985 | Barfield et al. | 264/248 |
| 4,558,499 | 12/1985 | Brown | 29/1573 |
| 4,653,758 | 3/1987 | Solheim | 273/232 |

FOREIGN PATENT DOCUMENTS 61-100270 5/1986 Japan.
61-173907 8/1986 Japan.
63-199615 8/1988 Japan.

*Primary Examiner*—David A. Simmons
*Assistant Examiner*—Merrick Dixon
*Attorney, Agent, or Firm*—Juettner Pyle & Lloyd

[57] ABSTRACT

One or multiple piece golf balls are manufactured by a hot gate injection molding process in which a polymer is injected into a precise cavity defined by mating mold halves. Each individual set of mold halves is selfalignable by means of engageable inclined surfaces on the respective mold halves, which urge the halves into alignment around an axis through the poles, with one of the halves being movable around the axis to enable precise alignment around the parting line. The polymer is injected at a location spaced from the parting line to prevent the formation of a seam or irregular surface at the parting line equator of the ball.

4 Claims, 3 Drawing Sheets

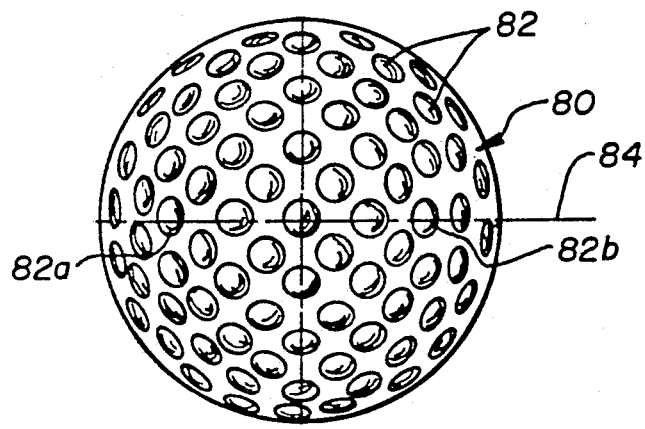
FIG. 5
FIG. 1
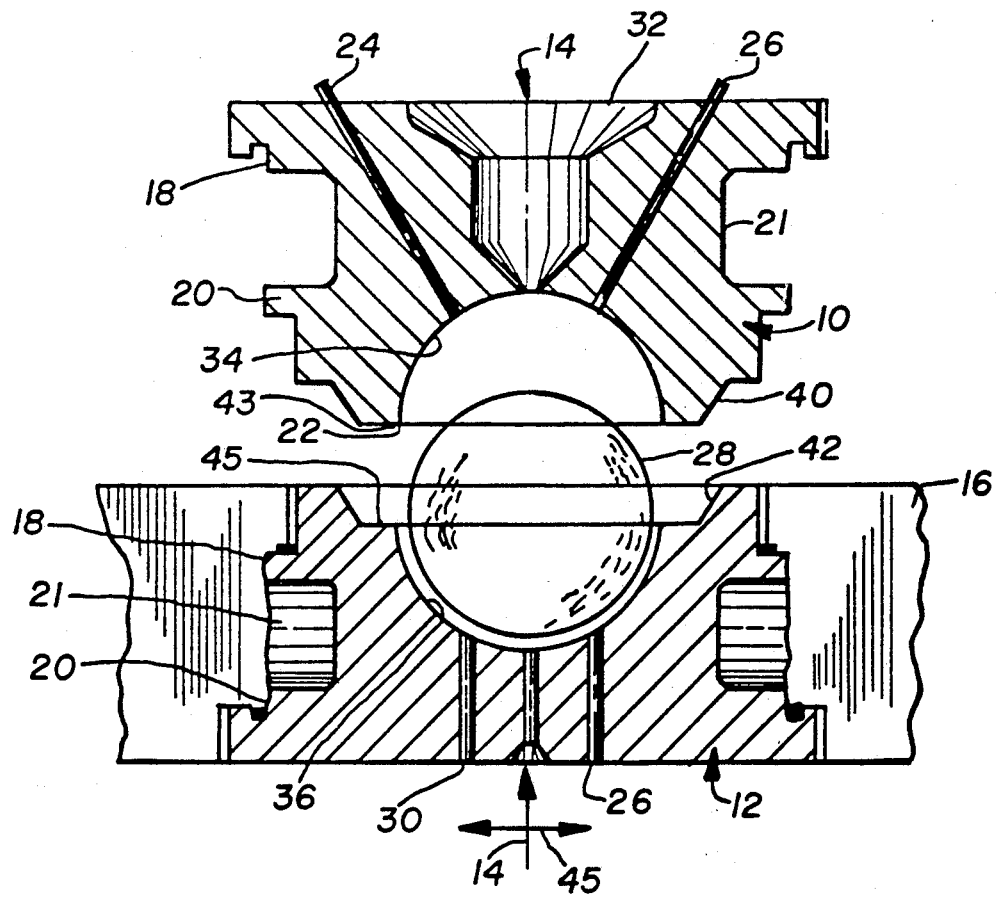

GOLF BALL APPARATUS AND METHOD FOR MANUFACTURE

This is a continuation-in-part of Ser. No. 07/463,286 filed Jan. 10, 1990, now abandoned.

BACKGROUND OF THE INVENTION

This invention relates to golf balls and a method for making golf balls having highly accurate and consistent dimensions and properties.

The production of golf balls involves several different steps, depending on the type of ball, such as three, two or one piece. According to the traditional method, a solid or composite elastomeric core is made, and an outer dimpled cover is formed around the core.

One method of applying a golf ball cover is by injection molding. The core is positioned centrally in a two part mold cavity and is held in a central position by retractable pins. The cover composition such as an ionomer is heated to a liquid and forced into the mold cavity through sprues located around the parting line between the mold halves. The surfaces of the mold halves have a number of protrusions or convex dimples arranged in a pattern, which cause corresponding dimples to be formed in the outer surface of the cover.

Upon cooling and removal from the mold, the golf ball comprises a central core surrounded by a dimpled cover of uniform thickness. In addition, however, the ball at this stage will include a number of solidified runners or flashing of cover material that extend from the sprues and the parting line seam of the mold halves. These solidified runners must be removed from the mold apparatus and must also be removed from the ball by a separate grinding or sanding operation. The sanding operation is imprecise and often causes irregularities on the ball surfaces.

After the flashings have been removed, the ball is painted with a known paint composition to attain a bright finish.

In view of the problems with flashing extending from the ball after the injection operation, it has been impossible to form dimples which extend across, or closely adjacent to the parting line. As a result, this may limit the number of dimple patterns which are available for the molding operation. One proposed solution to this problem is found in U.S. Pat. No. 4,653,758, in which two cover halves having undulating surfaces are fitted together within the mold. While this allows an improvement in the symmetry of the dimples, the ball will still have flashings, and no dimples may be placed on the juncture between the two cover halves.

Another problem arises in conjunction with the injection or other molding of golf ball exteriors, particularly when a number of opposed cavities are employed in a single machine. Heretofore, the mold cavities have been made by imprecise methods. Also, since the mold is repeatedly heated and cooled, some portions of the apparatus may expand and contract more than others. As a result, very often the mold halves of all molds cannot be brought into precise alignment prior to and during the injection operation. This, in return, results in defects, such as imperfect joinder at the parting line, or a ball which is out of round, or an outer surface which is not concentric with the spherical inner core.

All of the foregoing problems in commercial golf ball production result in balls having inconsistent performance. With the advent of more advanced golf equipment to allow better consistency and accuracy, it would be desirable to have parallel advances in the art of making golf balls.

SUMMARY OF THE INVENTION

In accordance with the present invention, a golf ball mold is provided in which the apparatus includes one or a plurality of pairs of mating mold halves. Each pair of opposed mold halves are provided with separate or individual alignment means to cause the halves to come into perfect interlock alignment when the mold is closed. This may be accomplished by use of inclined surfaces on the respective halves which engage and line up the respective pairs of mold halves precisely around the parting line. One of the mold halves may have a limited degree of free movement to facilitate this alignment. This eliminates leakage of the liquid polymer from around the parting line during ejection, or permits very close tolerances at the parting line, so that a visible seam is not formed during the molding operation.

Rather than injecting the liquid or molten polymer into the mold at locations on the parting line, the liquid may be injected at one or both poles through one or more gates, which are continuously supplied with the liquid molten cover material, such that no cold runners or flashings are formed which would require removal.

Since the cover is formed in a seamless fashion, it is possible to mold dimples onto or closely adjacent the parting line. Also, the molding may take place in a horizontal plane, which facilitates removal of the finished balls.

The molding of golf balls in accordance with the present invention is accomplished with a high degree of reliability and precision, resulting in golf balls having uniform characteristics and freedom from defects.

THE DRAWINGS

FIG. 1 is a vertical sectional view of the two part golf ball mold of the present invention.

FIG. 5 is a golf ball having dimples formed along the parting line in accordance with the present invention.

DESCRIPTION OF THE PREFERRED EMBODIMENTS

Figure 2:
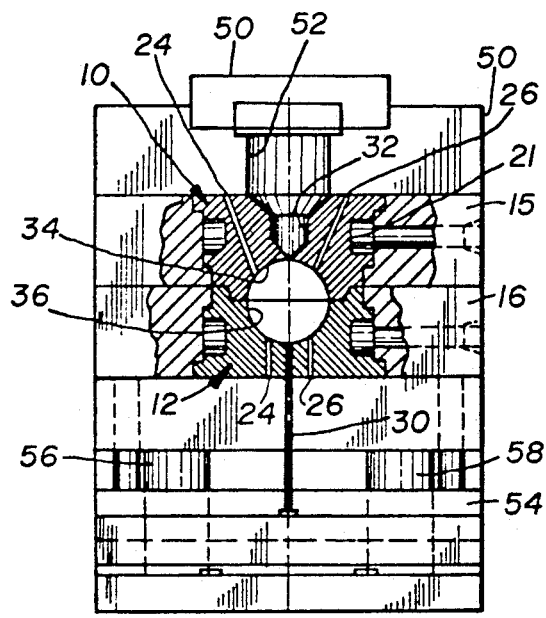
FIG. 2 is a vertical sectional view of the golf ball mold apparatus of the present invention.

The golf ball mold of the present invention is generally shown in cross section in FIG. 1. The mold halves 10 and 12 are generally cylindrical around an axis defined by the arrows 14. Each mold half 10 and 12 is retained in a platen, of which only the lower platen 16 is shown for mold half 12 in FIG. 1 for the sake of simplicity. Each of the mold halves comprises a pair of spaced external cylindrical shoulders 18 and 20 which are fitted into corresponding circular bores in the platens as shown. The shoulders 18 and 20 and the platen 16 define therebetween a sealed chamber 21 for circulation of cooling liquid during the post-injection molding process.

The mold halves 10 and 12 are shown in a separated position and are moved together in the direction of arrows 14 to close the mold around a circular parting line defined by the circular edges, such as 22. In accordance with conventional practice, each mold half may include a plurality of pins 24 and 26 which may project into the hemispherical mold cavities 34 and 36 for supporting a preformed elastomeric core 28 of conventional one- to two-piece construction. One of the mold members 12 may also include provision for an injector pin at 30 to allow ejection of the ball upon cooling and separation of the molds.

At least one of the mold halves such as 10 includes means for supplying the mold interior with hot liquid polymer into the cavity of the mold. A heated gate 32 is provided into the mold cavity at one or more locations spaced away from the parting line and preferably at one or more poles intersected by axis 14.

Figure 3:
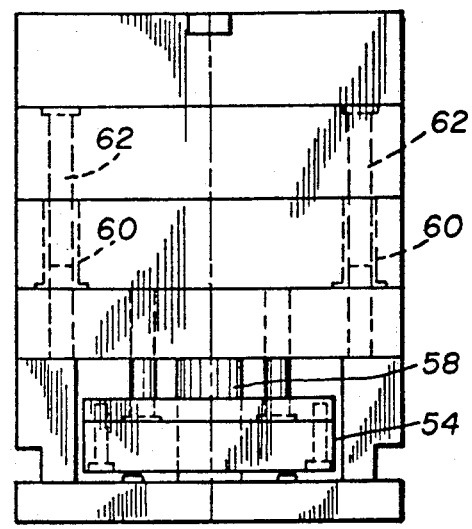
FIG. 3 is a side view of the apparatus shown in FIG. 2.

The details of the molding of a golf ball cover around a core are known in the art as shown in FIGS. 1-3, and need not be described in great detail. The identically sized hemispherical mold cavities or surfaces 34 and 36 in the mold halves 10 and 12 have a plurality of convex dimples (not shown), which impart concave dimples in the surface of the golf ball during the molding operation. The mold halves are separated, and an elastomeric core 28 is placed in the mold cavity and supported centrally therein by the pins 24 and 26. The core 28 may be composed of homogeneous elastomer composition of known type or may be composed of layers, i.e., a central core surrounded by rubber windings. In the alternative, the core may be omitted, and a one piece ball may be formed solely by injection.

In the embodiment shown, the mold halves are closed define a spherical shell of space between the core and mold walls. Hot liquid polymer is then injected through the gate 32 into the space around the core. The polymeric material used to form the cover of the ball may include thermosetting and thermoforming compositions such as ionomers or other natural and synthetic elastomers or polymers and blends thereof.

After injection of the cover material through the gate, the mold is cooled by circulation of coolant in the channels 21 and the pins 24 and 26 are withdrawn to a position flush with the mold surface, such that a continuous cover is molded around the ball. The heads of the pins 24 and 26 may simulate single dimples to avoid the problem of an irregular dimple pattern. Upon cooling, the mold is opened, and the golf ball is removed.

The entire mold apparatus is shown in FIGS. 2 and 3. The mold halves 10 and 12 are supported and housed in surrounding platens 15 and 16. One of the platens, in this case, the upper platen 15, is secured to a manifold 50 having a central bore 52 that receives a conventional nozzle bushing containing a conventional injection nozzle that closes and opens to supply molten polymer to the mold. The nozzle and manifold may contain a heating element to maintain the polymer in molten condition between injection cycles. The manifold 50 may contain multiple passages to supply a plurality of molds. The molten polymer is heated and supplied under pressure by a conventional extruder.

The mold assembly includes means to permit the opening and closing of the mold under pressure. The lower platen 16 is axially movable and is mounted on a carriage 54 that moves on a pair of spaced axial columns 56 and 58. Additional registration between the mold halves is provided by a plurality of guides which include vertical bushings 60 that slidably receive posts 62 and are preferably located around the periphery of the mold. Although not shown for the sake of brevity, it is common to provide a plurality of molds in an opposed pair of supports or platens in order to mold a plurality of balls in a single operation, for example, as generally shown in U.S. Pat. No. 4,558,499.

In accordance with the present invention, individual alignment means is provided between each pair of mold halves in order to assure highly accurate register between the mold halves at the parting line, and to prevent the formation of a highly visible seam or line at the parting line. The alignment means generally comprises a means for aligning the mold halves around a first axis through the poles of the mold while the mold is being closed and a second means for allowing limited movement between the mold halves in directions generally perpendicular or at angles to the first axis.

As shown in FIGS. 1 and 2, one of the mold halves such as 10 is provided with a inwardly tapered or fustro-conical shoulder or surface 40 which is concentric with the axis 14 of closure of the mold, or an axis through the poles of the mold. The other mold half 12 is provided with a matching fustro-conical or outwardly tapered groove or wall 42 which is also concentric with the axis 14. As shown, the surfaces 40 and 42 are also concentric with the circular parting line 22. The surfaces 40 and 42 are spaced outwardly and extend away from respective flat disc surfaces 42 and 45 extending horizontally from the parting line. When the mold is closed, the opposed surfaces 43 and 45 come into sealing engagement in the plane of the parting line.

As shown in FIGS. 1 and 2, the angle of taper of the surfaces 40 and 42 is substantially the same. Thus, when the mold halves are brought together prior to injection, the surfaces 40 and 42 come into preferential locking or interfitting engagement and serve to align the two mold halves with high precision at the parting line.

In order to further accommodate possible misalignment between the mold halves, means are provided to permit limited movement between the mold halves in directions perpendicular to the axis 14, or in a direction generally indicated by arrow 45. This may be accomplished by allowing one of the mold halves to float somewhat in its supporting platen. For example, as shown in FIGS. 1 and 2, the engagement between circular openings in the platen 16 opposite the cylindrical shoulders 18 and 20 would normally prevent sideways or lateral as well as vertical or angular movement of the mold half 12 in the platen. By providing a limited clearance between these opposed surfaces, in the order of from what 0.002 to about 0.008 inches, sufficient lateral movement is permitted to allow the axial alignment means to function, depending, of course, on the overall tolerances employed. The limited movement allows one mold member to float somewhat in a constrained fashion, that is, only in a direction or directions perpendicular to the closing axis 14, in response to the alignment forces generated by the centering wedging engagement between the inclined alignment surfaces as clearly shown in the drawings.

Due to the high precision of alignment at the parting line, it is possible to mold a golf ball cover with a high degree of precision and accuracy. In addition, due to the improved alignment, it is possible to provide mold halves in which dimples extend across or intersect the parting line of the mold.

Figure 4:
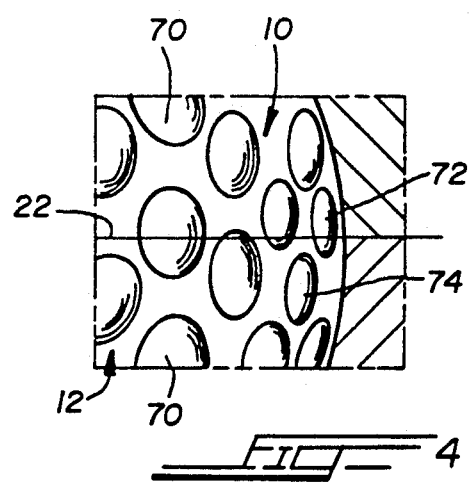
FIG. 4 is an enlarged view of the mold cavities near the parting line of the mold.

FIG. 4 is an enlarged view of a molding cavity of the present invention. The two mold halves 10 and 12 each have a plurality of protrusions or convex dimples 70, and the mold halves engage at a parting line 22. The mold dimples such as 72 and 74 may be placed on or closely adjacent the parting line 22, which is a feature heretofore not available due to the imprecise molding methods.

Figure 6:
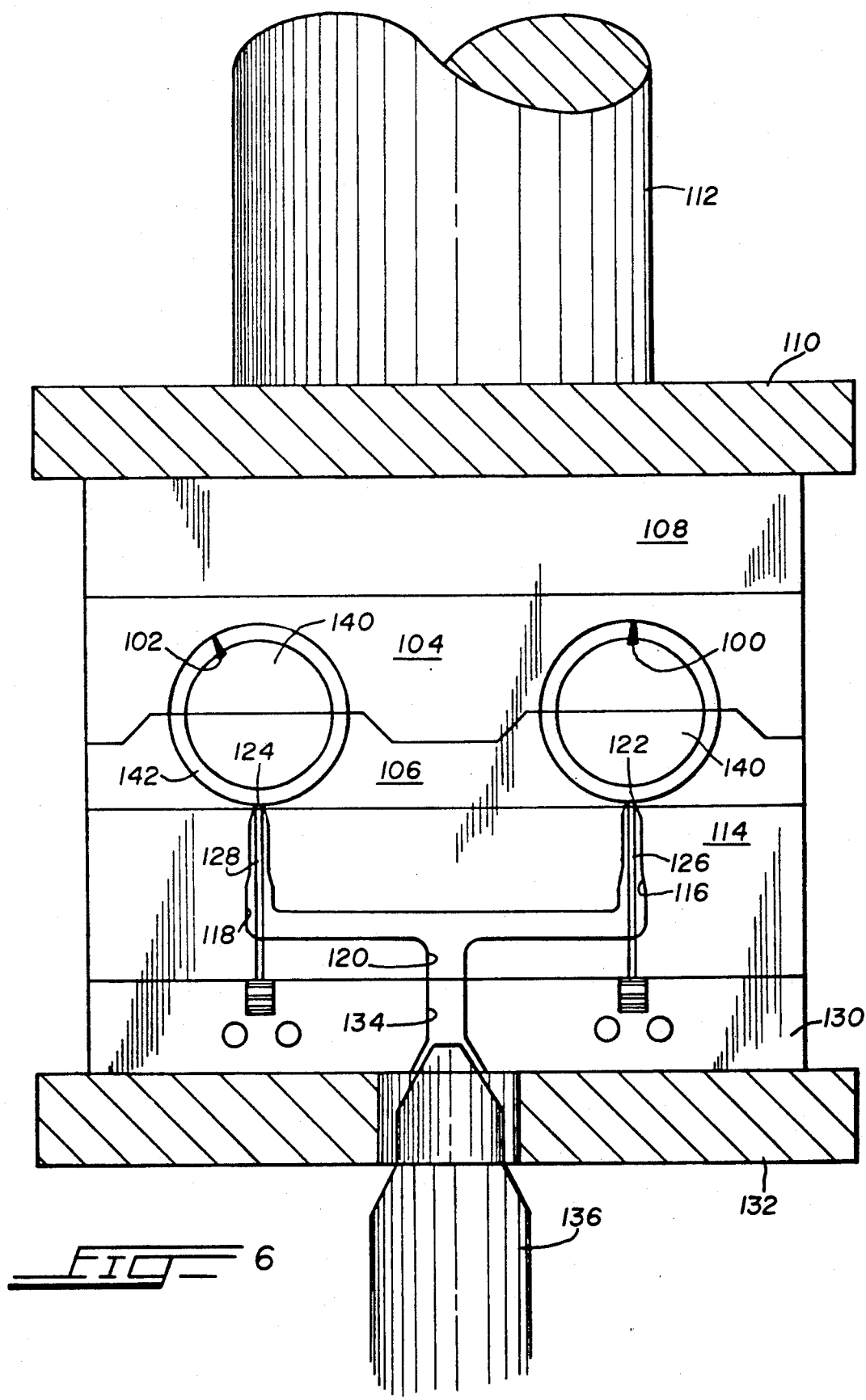
FIG. 6 is a vertical sectional view of the apparatus of the present invention.

FIG. 6 illustrates a partial sectional view of the overall apparatus of the present invention in which the apparatus is arranged to open and close generally along an axis in a horizontal plane. The mold includes a plurality of individually aligning pairs of semi-spherical cavities such as 100 and 102, as described in the previous embodiments, with the cavities being retained in cavity plates 104 and 106. One of the cavity plates 104 is secured to a mold base 108 and platen 110. The platen 110 is connected to the operating rod 112 of a ram or hydraulic cylinder (not shown), which is operative to close the mold under pressure, and to thereafter open the mold.

The other relatively stationary, cavity plate 106 is secured to a hot runner plate 114 which may contain conventional heating means (not shown). The plate 114 includes a plurality of runners or sprues such as 116 and 118 leading from a common central supply port 120 to gated inlets 122 and 124 at the respective cavities 100 and 102. The inlets 122 and 124 are opened and closed by respective gate valves 126 and 128 in the form of retractable pins as shown. The ends of the pins are shaped in the form of a dimple or particular surface area of the cover so that the finished product will have a uniform appearance.

The hot runner plate 114 is secured to a mold base 130 and stationary platen 132 having a central passage 134 connected to supply port 120, said passage being connected to the injection barrel of an extruder 136.

In operation, the ram 112 and the associated relatively movable members 104, 108 and 110 are moved along a horizontal axis to cause self-aligning engagement of the members 104 and 106 as described in the previous embodiments. The mold cavities contain cores 140 disposed centrally in the cavities. The gates 122 and 124 are opened by retraction of pins 126 and 128, and hot liquid cover material is forced into the cavities through the indicated passages in order to form a layer or dimpled cover 142 around the cores 140. The valves are then closed, and the cavity plates 104 and 106 are cooled to solidify the cover material, while the cover material in the passages 116, 118 and 120 are maintained in a hot, liquid condition. The mold is then opened, and the finished balls are removed. The horizontal configuration facilitates removal of the balls from the mold under the influence of gravity.

A typical golf ball made from a mold similar to that shown in FIG. 4 is illustrated in FIG. 5, the ball 80 has a plurality of concave dimples 82, including dimples such as 82a and 82b which either intersect, or are closely adjacent the equator or parting line 84. As a consequence, it is possible to design and manufacture golf balls having greater varieties of dimple patterns than by previous methods in which the equator was devoid of dimples.

Another unique benefit and result of the present invention is the ability to produce a completely finished golf ball by the process of the present invention. Upon removal from the mold, the ball may be used in its then current form without the need for subsequent grinding along the seam line or painting. As described previously, grinding may result in imperfections which need to be covered by paint. Also, the painting operation itself is imprecise and results in an irregular outer coating on the ball.

While the present invention has been described in connection with injection molding, suitable modifications can be made to enable the use of a shell molding technique. In such a case, preformed shell halves of cover material are placed around the core, and the mold is closed and heated under pressure to fuse the shell to the core and to form the dimples.

I claim:

1. In a method for making a golf ball in a two part spherical cavity wherein two mold halves are moved relative to each other along an axis into engagement to define a cavity having a circular parting line, the improvement comprising the steps of moving the mold halves into engagement along said axis, providing engageable inclined alignment surfaces on the respective mold halves with said surfaces being concentric with said parting line, said inclined surfaces being engaged upon engagement of said mold halves, and while said mold halves are brought into engagement, allowing relative movement of one of said mold halves only in a direction perpendicular to said axis to cause the engagement of said alignment surfaces to bring the mold halves into precise alignment at said circular parting line.

2. The method of claim 1 comprising the additional step of injecting liquid polymeric material into said cavity at a location spaced away from said parting line.

3. Method of molding golf balls in a two part spherical cavity having a circular parting line and an axis perpendicular to said parting line, said method comprising the steps of supporting a plurality of mold halves in a first support, disposing a second plurality of mold halves in a second support in general opposed alignment with the first plurality, moving the supports toward each other along said axis to close opposed sets of mold halves and define a plurality of molding cavities having a circular parting line, separately aligning individual opposed sets of mold halves around axes parallel to said axis during the closing operation while allowing limited relative movement between the respective sets of mold halves only in a direction perpendicular to said axis to precisely align the respective sets of mold halves on the parting line, injecting polymeric material into the mold cavities at a location spaced from the parting line, allowing the polymer to solidify, and opening the molds to remove the balls.

4. The method of claim 3 wherein the step of opening said molds comprises the step of opening said molds by moving said supports away from each other along said axis, with said axis being generally horizontal, and said balls are removed by falling out of the mold halves under the influence of gravity.

* * * * *